United States Patent [19]

Ludke

[11] Patent Number: 5,086,906
[45] Date of Patent: Feb. 11, 1992

[54] DIVERTER FOR ROLLER CONVEYORS

[75] Inventor: Arnold Ludke, Oakland, N.J.

[73] Assignee: AL Industries, Fairfield, N.J.

[21] Appl. No.: 658,186

[22] Filed: Feb. 20, 1991

[51] Int. Cl.⁵ .......................................... B65G 47/46
[52] U.S. Cl. .................................... 198/372; 198/782; 198/790
[58] Field of Search .............. 198/370, 372, 365, 782, 198/790, 631, 861.6, 817, 369, 367

[56] References Cited

U.S. PATENT DOCUMENTS

| | | | |
|---|---|---|---|
| 2,334,384 | 11/1943 | Cohen | 198/369 |
| 3,303,923 | 2/1967 | Davis | 198/365 X |
| 3,983,988 | 10/1976 | Maxted et al. | 198/365 |
| 4,244,461 | 1/1981 | Fischer et al. | 198/817 X |
| 4,264,002 | 4/1981 | Van Der Schie | 198/365 |
| 4,598,815 | 7/1986 | Adama | 198/372 |
| 4,696,386 | 9/1987 | Lem | 198/372 |
| 4,733,768 | 3/1988 | Aquino et al. | 198/365 X |
| 4,746,003 | 5/1988 | Yu et al. | 198/372 X |
| 4,792,034 | 12/1988 | Leemkuil | 198/372 |

FOREIGN PATENT DOCUMENTS

| | | | |
|---|---|---|---|
| 0031211 | 2/1984 | Japan | 198/365 |
| 0211217 | 9/1986 | Japan | 198/369 |
| 0100916 | 4/1990 | Japan | 198/369 |

Primary Examiner—D. Glenn Dayoan
Attorney, Agent, or Firm—Kenyon & Kenyon

[57] ABSTRACT

A diverter for a live roller conveyor has assemblies each with sheaves between which a span of O-ring is formed with the O-ring connected to the line shaft of the conveyor. The assembly can turn on a vertical axis so that the spans can be either aligned with the conveyor line of travel or to diverting positions. The diverter is positioned in a space formed between the conveyor rollers so that objects carried by the rollers ride on the spans of O-ring.

7 Claims, 4 Drawing Sheets

DIVERTER FOR ROLLER CONVEYORS

FIELD OF THE INVENTION

This invention relates to diverters for live roller conveyors.

Such a conveyor characteristically comprises horizontally extending side rails, a series of conveyor rollers mounted by the rails, a rotatively powered rotative line shaft extending parallel to and between the side rails at a level below the level of the conveyor rollers, and means for rotatively connecting the line shaft to the rollers so that the rollers are rotatively powered or "live". Objects placed on the rollers at a loading location are conveyed away from that location to a delivery location.

A diverter is a mechanism positioned between such locations for selectively diverting the conveyed objects angularly away from the conveyors. Some of the conveyor rollers may be eliminated to form a space for installation of the diverter.

BACKGROUND OF THE INVENTION

Background can be obtained from the following U.S. Pat. Nos.:

| | | | |
|---|---|---|---|
| 3058565 | 3983988 | 4730718 | 4880099 |
| 3138238 | 4372435 | 4746003 | 4913277 |
| 3921786 | 4598815 | 4792034 | |

One object of this invention is to provide a new diverter that is comparitively simple to make and install and which can be powered by the conveyor line shaft for positive divertor action.

SUMMARY OF THE INVENTION

Briefly summarized the diverter of this invention has a row of assemblies each comprising two radially aligned and interspaced sheaves or wheels having grooved peripheries. An O-ring is reeved or looped over the sheaves and forms a straight horizontal span between the sheaves. Each assembly is mounted to turn in a horizontal plane on a vertical axis by a bridge that extends transversely between side plates which are attached to the conveyor side rails when the diverter is installed on the conveyor, with the row of assemblies positioned with their belt spans on or very slightly above the level of the conveyor rollers. The term "level" has reference to a plane tangent to the tops of the conveyor rollers. The assemblies are interconnected to turn in synchronism between positions where the belt spans are at right angles to the rollers and positions where the belt spans divert, and their belts are connected to the conveyor's line shaft so that the belts are powered by that shaft.

DESCRIPTION OF THE DRAWINGS

A specific embodiment of the invention is illustrated by the accompanying drawings in which.

DESCRIPTION OF THE PREFERRED EMBODIMENTS

Figure 1:
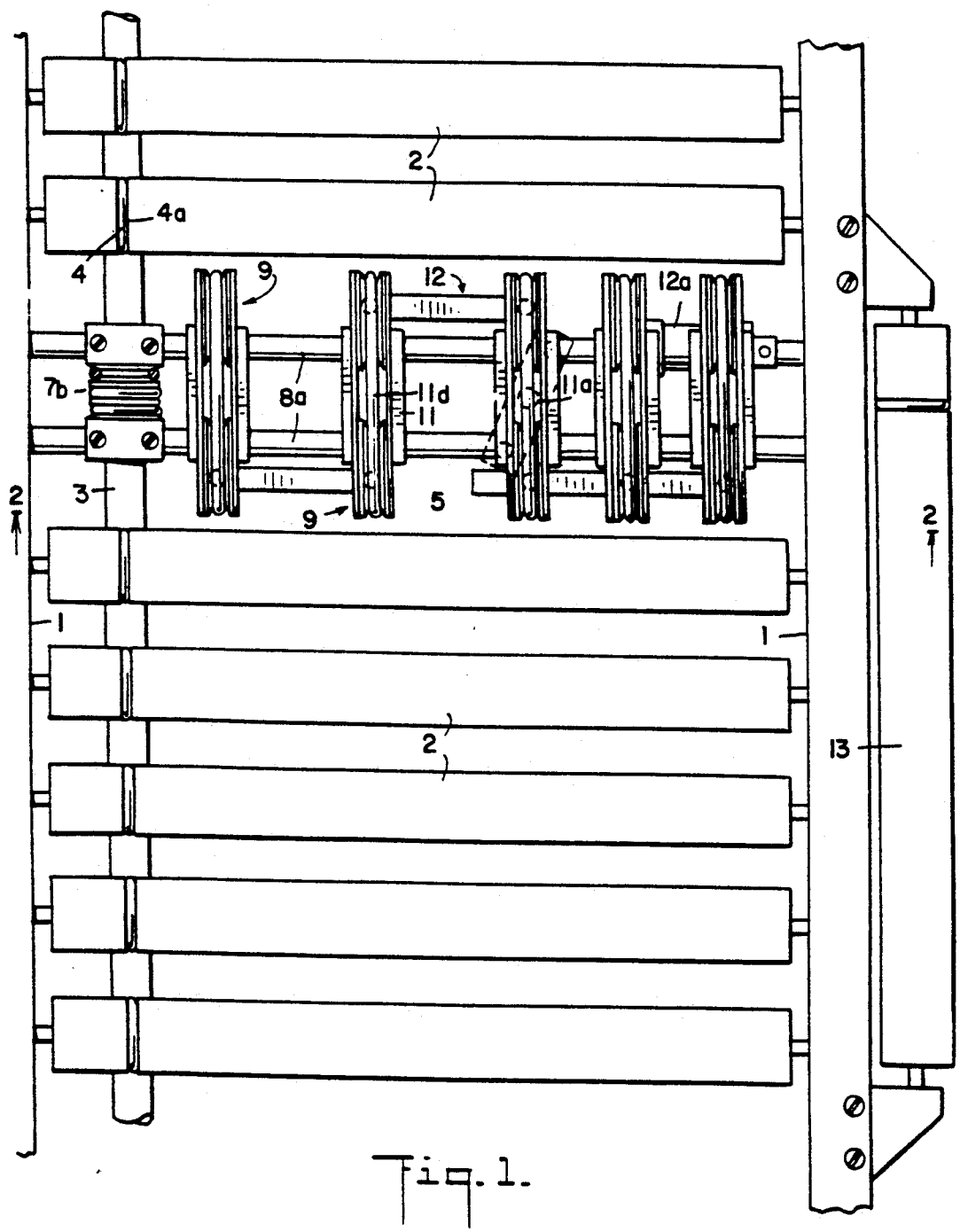
FIG. 1 is a top or plan view of the new diverter installed in a live roller conveyor and in non-diverting operation.
Figure 2:
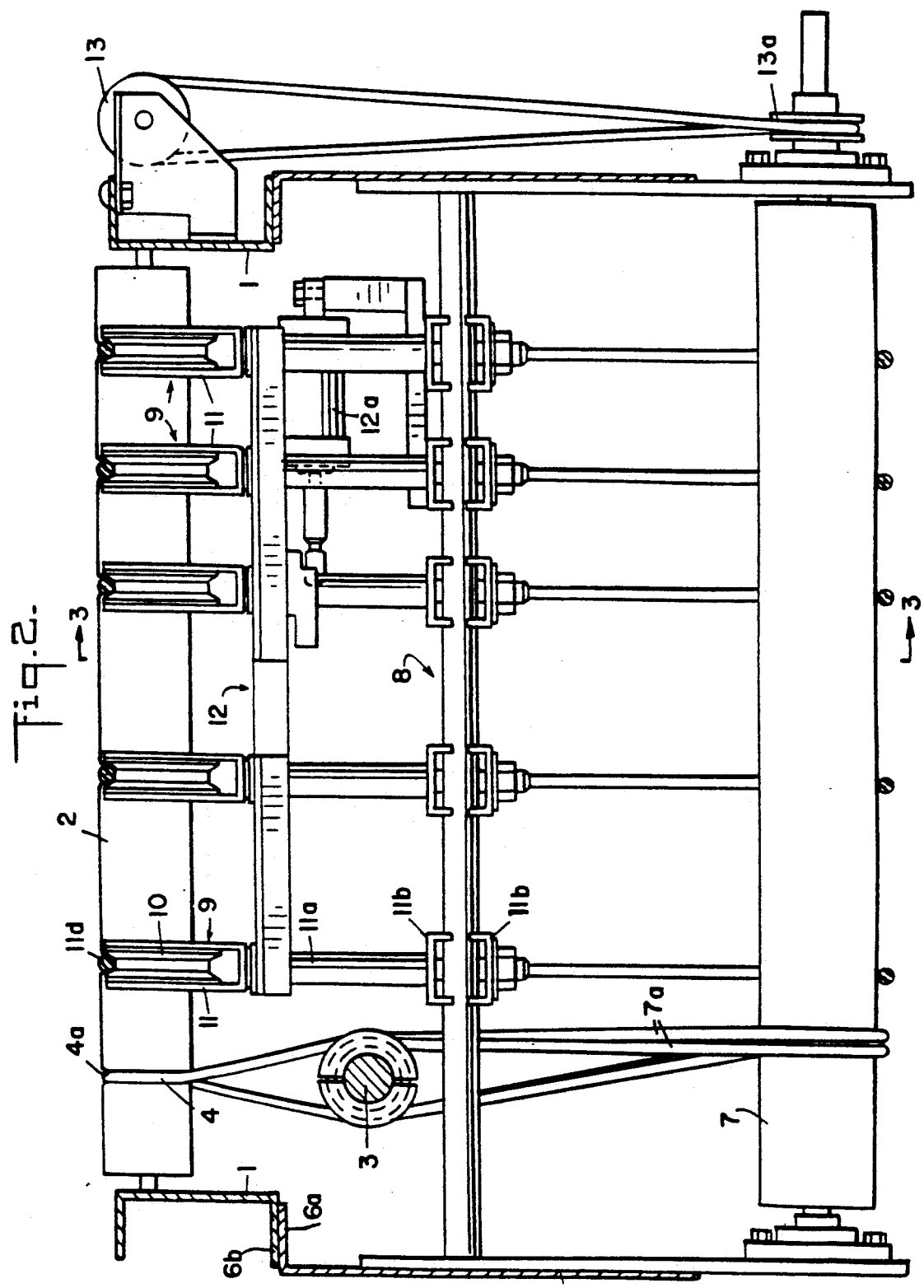
FIG. 2 is a cross section taken on the line 2—2 in FIG. 1.
Figure 3:
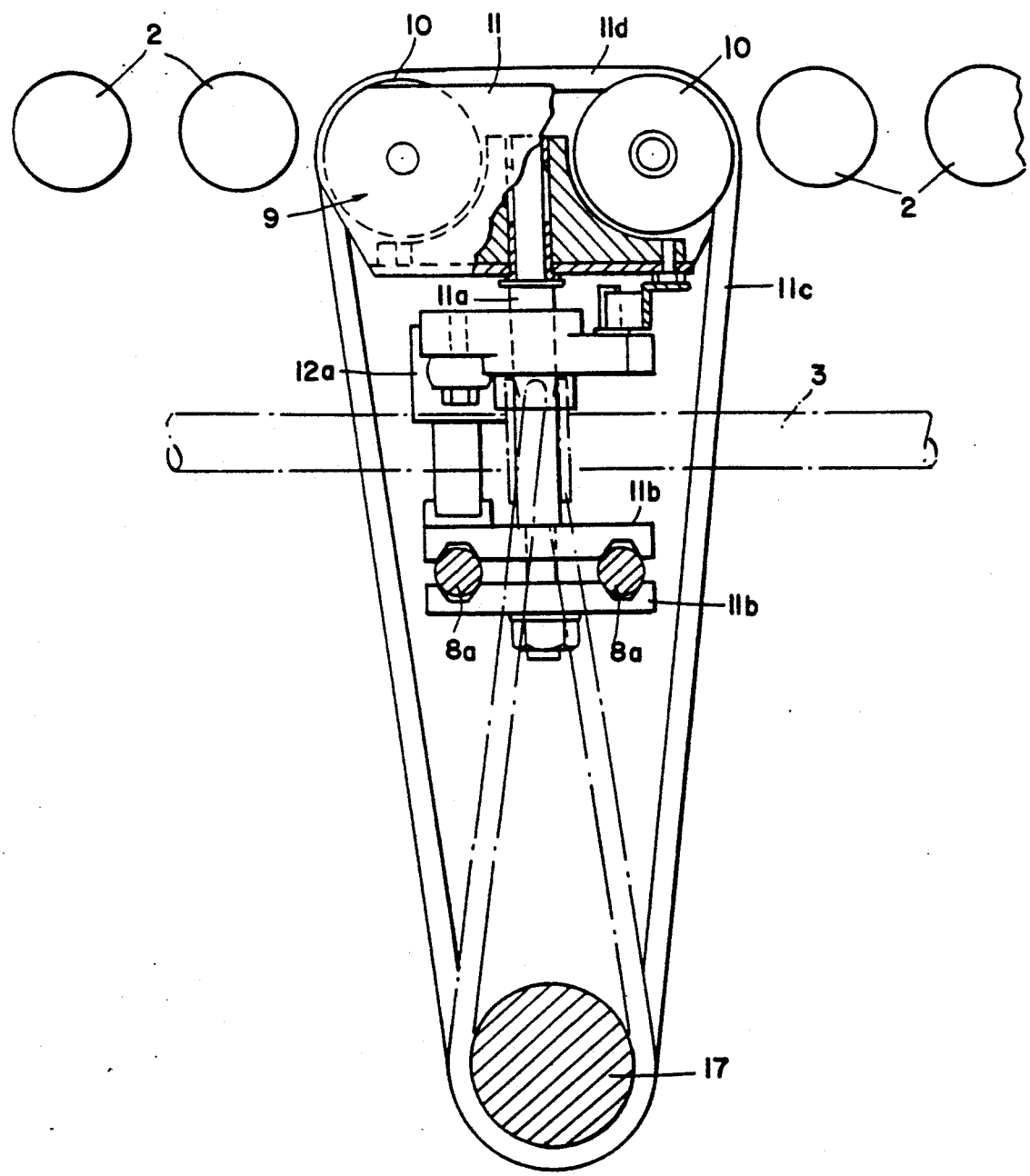
FIG. 3 is a cross section taken on the line 3—3 in FIG. 2.
Figure 4:
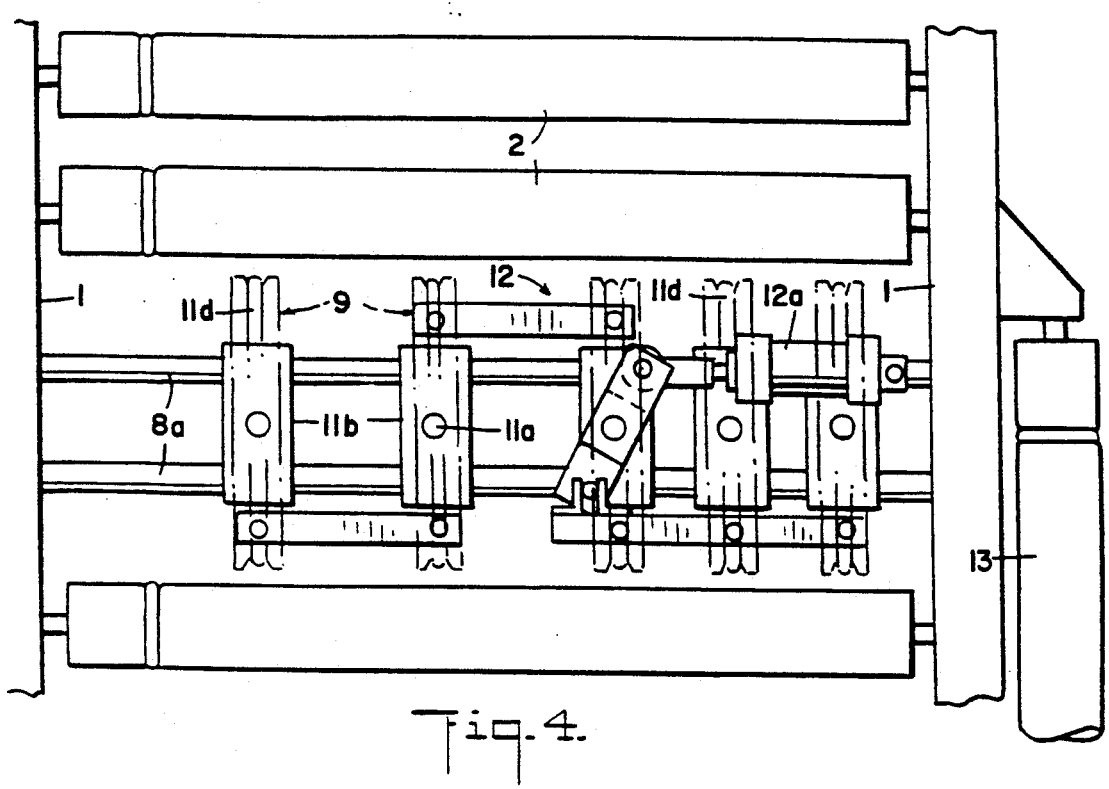
FIG. 4 is like FIG. 1 but shows the diverter with parts removed to show parts not shown by FIG. 1.
Figure 5:
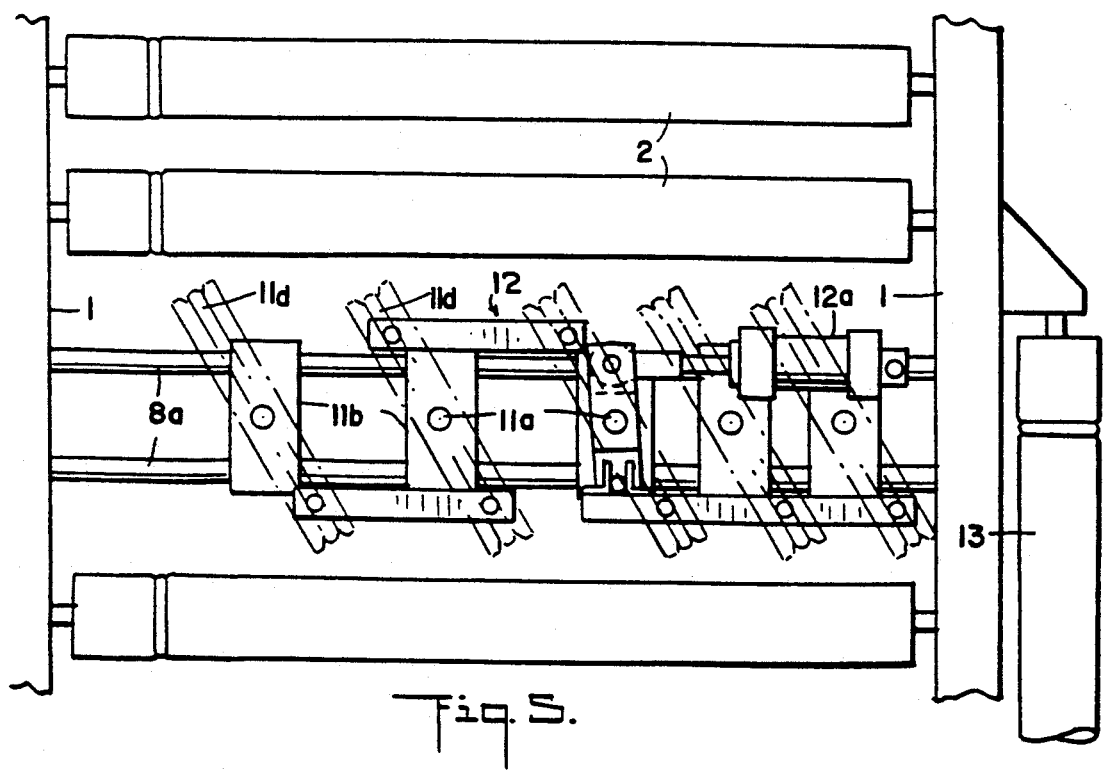
FIG. 5 is like FIG. 4 but shows the diverter in diverting operation.

These drawings show a short length of the conveyor having the horizontally extending side rails 1, the series of conveyor rollers 2, the rotatively powered rotative line shaft 3 extending parallel to and between the side rails at a level below the conveyor rollers, and belts 4 rotatively connecting the line shaft to the rollers so that the rollers are rotatively powered by the line shaft. The belts 4 are commonly called "O-rings" because they are formed by lengths of flexible non-metallic material of round or O-ring cross section with each length having its ends interconnected to form an endless loop. At each conveyor roller a sheave (not shown) is fixed to the line shaft and one end of the roller forms a sheave 4a. An O-ring 4 is reaved over these two sheaves. The line shaft is normally powered by an electric motor (not shown).

The new diverter is installed in a space 5 formed by removal of two of the conveyor rollers.

It comprises two horizontally interspaced end plates 6 having flanges 6a on their upper ends which are connected to the flanges 6b of the channel-section side rails 1 of the conveyor. These plates depend vertically from the side rails and a horizontal rotative drive shaft 7 is mounted by the plates' lower end portions transversely therebetween. A pair of O-rings 7a are reeved on one end portion of the drive shaft and a split sheave 7b clamped on the line shaft 3 so that the drive shaft is rotatively powered by the line shaft. This drive shaft 7 is cylindrical and of large diameter as compared to its length which extends from one side plate to the other. The split sheave is a double sheave to accomodate the two O-rings.

A horizontal bridge 8 is mounted by the side plates 6 transversely therebetween above the drive shaft 7 and below the space 5. This bridge is formed by two laterally interspaced mutually parallel bars 8a having their ends fixed to the side plates. These bars 8a or bridge and the drive shaft and side plates 6 form what is in effect a frame which as installed position the bridge at a level below the conveyor rollers.

A row of assemblies 9 is mounted by the bridge, each assembly comprising two radially aligned and horizontally interspaced sheaves 10 which are mounted on horizontal axis by a bracket 11 pivoting on a vertical axle post 11a having a lower end positioned by releasable clamps 11b clamped on the bars 8a so that the assemblies can be individually shifted horizontally. Each assembly has an O-ring 11c reeved over these sheaves, and it extends downwardly and is reeved over the drive shaft 7. Between the sheaves 10 the O-ring forms a straight span 11d.

The side plates 6 can be made adjustable in length to permit adjustment of the vertical position of the assemblies 9 and therefore the position of their belt spans 11d formed between the sheaves 10. Normally the belt spans are positioned with their tops on or very slightly above the level of the conveyor rollers.

The assemblies are interconnected by a pantograph 12 acuated by a pneumatic or electro-magnetic thruster 12a of the remote-controlled type. This pantograph or system of levers and links causes the assemblies to turn in synchronism between positions positioning their horizontal belt spans at right angles to the conveyor roller and diverting positions.

In operation with the diverter installed in the roller conveyor, the drive shaft 3 can be rotatively powered as usual, turning the conveyor rollers forwardly to forwardly carry objects placed on the conveyor. The diverter is also powered and with the drive shaft 7 powered the O-rings 11 are powered so their spans 11d travel forwardly. An object carried by the roller conveyor rides on the belt spans and over the space 5 without interruption.

Actuation of the thruster 12a shifts the assemblies to diverting positions where their O-ring spans 11d divert from the line of travel of the conveyor. Then when a conveyed object reaches the diverter it is diverted angularly away from the conveyor. For more positively carrying away the diverted object this new diverter provides a long roller 13 of relatively large diameter rotatively mounted by the one of the side rails 1 on the diverting side of the conveyor, and extending horizontally parallel to this side rail and at the level of the conveyor rollers.

This roller 13 is powered to turn in the diverting direction by an O-ring reeved over an end of the roller and over a sheave 13a on an extension of the drive shaft 7, on the outside of the side plate.

When the assemblies are turned their O-rings going to and from the drive shaft 7 must twist which they can do because of their flexibility. The large diameter of the drive shaft keep the O-rings separated so they do not entangle. Also because the drive shaft is cylindrical with a smooth surface the O-rings can be positioned thereon at positions corresponding to the positions of the assemblies permitting the latter to be located at any position relative to each other.

What is claimed is:

1. A conveyor diverter comprising a row of assemblies each comprising two radially aligned and horizontally interspaced sheaves and a belt reeved over the sheaves and forming a horizontal span therebetween positioned to receive and carry objects conveyed by the conveyor, and means for mounting the assemblies so that they each can turn on a vertical axis positioned between the sheaves.

2. The diverter of claim 1 in which a powered rotary drive shaft extends under the assemblies and the belt of each assembly is endless and reeved over the drive shaft and is flexible so as to twist when the assembly is turned.

3. A diverter for a live roller conveyor having horizontally interspaced side rails, a series of conveyor rollers mounted by said rails, a rotative line shaft extending parallel to and between said rails, means for rotatively connecting said shaft to said rollers, and said rollers forming a space in which said diverter can be installed; said diverter comprising horizontally interspaced side plates having upper ends connected to said side rails and depending vertically therefrom and having lower portions, a horizontal rotary drive shaft mounted by said lower portions transversely therebetween, means for connecting said drive shaft rotatively to said line shaft, a horizontal bridge mounted by said side plates transversely therebetween above said drive shaft and below said space formed by said conveyor rollers, a row of assemblies mounted by said bridge and each comprising two radially aligned and horizontally interspaced sheaves and an endless belt reeved over the sheaves and forming a horizontal span therebetween spanning said space formed by said converter rollers and extending downwardly and reeved over said drive shaft, each of said assemblies having means for mounting it on said bridge so the assembly can turn on a vertical axis positioned between the sheaves and said belts being flexible and twisting when said assemblies are turned, and means for turning said assemblies so they turn in synchronism between positions positioning their said horizontal belt spans at right angles to said conveyor rollers and positions where said belt spans diverge therefrom.

4. The diverter of claim 3 in which said side plates are each adjustable in vertical length so to position said rotary drive shaft and said bridge at differing heights.

5. The diverter of claim 3 in which said means for connecting said drive shaft rotatively to said line shaft comprises a split sheave clamped to said line shaft and a flexible belt reeved around said sheave and extending to and reeved on said drive shaft.

6. The diverter of claim 3 in which said bridge comprises two horizontally interspaced carrier rods having ends connected to said side plates, and said assemblies each comprise a vertical post having a lower end extending between said carrier rods and clamps clamping said lower end to said carrier rods, said post having an upper end and a sheave bracket rotatively mounted thereon and rotatively mounting said sheaves.

7. The diverter of claim 3 in which said assemblies are mounted by said bridge by means permitting each assembly to be moved longitudinally on the bridge so the assemblies can be adjustably interspaced, and said drive shaft is cylindrical and of large diameter as compared to its length so that said belts reeved thereon can be positioned thereon at positions corresponding to the positions of said assemblies.

* * * * *